(12) United States Patent
Niu et al.

(10) Patent No.: US 10,747,083 B2
(45) Date of Patent: Aug. 18, 2020

(54) LIQUID CRYSTAL LENS, LENS ASSEMBLY, OPTICAL APPARATUS AND DISPLAY DEVICE

(71) Applicant: BOE TECHNOLOGY GROUP CO., LTD., Beijing (CN)

(72) Inventors: Xiaochen Niu, Beijing (CN); Xue Dong, Beijing (CN); Xiaochuan Chen, Beijing (CN); Wenqing Zhao, Beijing (CN); Dacheng Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 117 days.

(21) Appl. No.: 15/770,348

(22) PCT Filed: Sep. 11, 2017

(86) PCT No.: PCT/CN2017/101205
§ 371 (c)(1),
(2) Date: Apr. 23, 2018

(87) PCT Pub. No.: WO2018/126727
PCT Pub. Date: Jul. 12, 2018

(65) Prior Publication Data
US 2019/0064631 A1 Feb. 28, 2019

(30) Foreign Application Priority Data
Jan. 4, 2017 (CN) .......................... 2017 1 0004107

(51) Int. Cl.
*G02F 1/29* (2006.01)
*G02F 1/1343* (2006.01)

(52) U.S. Cl.
CPC .......... *G02F 1/29* (2013.01); *G02F 1/134309* (2013.01); *G02F 1/134363* (2013.01); *G02F 2001/294* (2013.01)

(58) Field of Classification Search
CPC ................. G02F 1/29; G02F 2001/294; G02F 1/134309; G02F 1/134363
(Continued)

(56) References Cited

U.S. PATENT DOCUMENTS

| 6,162,370 A | 12/2000 | Hackett et al. |
| 8,842,247 B2 | 9/2014 | Kashiwagi et al. |

(Continued)

FOREIGN PATENT DOCUMENTS

| CN | 102621763 A | 8/2012 |
| CN | 102851034 A | 1/2013 |

(Continued)

OTHER PUBLICATIONS

First Office Action dated Dec. 11, 2018 corresponding to Chinese application No. 201710004107.7.
(Continued)

*Primary Examiner* — Nathanael R Briggs
*Assistant Examiner* — William D Peterson
(74) *Attorney, Agent, or Firm* — Nath, Goldberg & Meyer; Joshua B. Goldberg (57) ABSTRACT

A liquid crystal lens, a lens assembly, an optical apparatus, and a display device are provided. The liquid crystal lens includes a first transparent substrate; a second transparent substrate, provided opposite to the first transparent substrate; a liquid crystal layer, provided between the first and second transparent substrates; and at least one first electrode and at least one second electrode, both of which being provided at a side of one of the first and second transparent substrates proximal to the liquid crystal layer. The at least one first electrode and the at least one second electrode are alternately arranged to be insulated from each other and have an interval therebetween.

20 Claims, 3 Drawing Sheets

(58) Field of Classification Search
USPC .......................................................... 349/96
See application file for complete search history.

(56) References Cited

U.S. PATENT DOCUMENTS

| | | |
|---|---|---|
| 9,442,302 B2 | 9/2016 | Kashiwagi et al. |
| 2007/0048916 A1 | 3/2007 | Suzuki et al. |
| 2008/0013002 A1 | 1/2008 | Hong et al. |
| 2013/0222742 A1* | 8/2013 | Kashiwagi ................ G02F 1/29 349/104 |
| 2014/0028932 A1* | 1/2014 | Kuo .................. G02F 1/133526 349/15 |
| 2014/0347615 A1 | 11/2014 | Oka et al. |
| 2016/0011431 A1* | 1/2016 | Kashiwagi ............. G02B 27/26 349/15 |

FOREIGN PATENT DOCUMENTS

| | | |
|---|---|---|
| CN | 103293818 A | 9/2013 |
| CN | 103293819 A | 9/2013 |
| CN | 105259725 A | 1/2016 |
| CN | 105388678 A | 3/2016 |
| CN | 106647092 A | 5/2017 |
| EP | 2728404 A2 | 5/2014 |
| JP | 2007-266490 A | 10/2007 |

OTHER PUBLICATIONS

International Search Report dated Oct. 31, 2017 issued in corresponding International Application No. PCT/CN2017/101205 along with an English translation of the Written Opinion.

* cited by examiner

LIQUID CRYSTAL LENS, LENS ASSEMBLY, OPTICAL APPARATUS AND DISPLAY DEVICE

CROSS-REFERENCE TO RELATED APPLICATIONS

The present application is a National Phase Application filed under 35 U.S.C. 371 as a national stage of PCT/CN2017/101205, filed Sep. 11, 2017, which claims the priority of Chinese Patent Application No. 201710004107.7, filed on Jan. 4, 2017, the contents of which are incorporated herein in their entirety by reference.

TECHNICAL FIELD

The present disclosure relates to the field of display technology, and in particular, relates to a liquid crystal lens, a lens assembly including the liquid crystal lens, an optical apparatus including the liquid crystal lens, and a display device including the liquid crystal lens.

BACKGROUND

In general, a liquid crystal lens can switch to different refractive states according to an electric field formed therein, and thus has been widely applied to the fields such as display, illumination, and the like.

SUMMARY

Embodiments of the present disclosure provide a liquid crystal lens, a lens assembly including the liquid crystal lens, an optical apparatus including the liquid crystal lens, and a display device including the liquid crystal lens.

In some embodiments, a first aspect of the present disclosure provides a liquid crystal lens. The liquid crystal lens includes a first transparent substrate; a second transparent substrate, provided opposite to the first transparent substrate; a liquid crystal layer, provided between the first transparent substrate and the second transparent substrate; and at least one first electrode and at least one second electrode, both of which being provided at a side of one of the first transparent substrate and the second transparent substrate proximal to the liquid crystal layer. The at least one first electrode and the at least one second electrode are alternately arranged to be insulated from each other and have an interval therebetween.

Optionally, each of the first electrode and the second electrode is made of a transparent electrode material.

Optionally, the liquid crystal layer includes a positive liquid crystal material.

Optionally, the liquid crystal lens further includes a polarizer. The polarizer is provided on a light incident surface of the liquid crystal lens, and a polarization direction of the polarizer is parallel to a major axis of each of liquid crystal molecules in a central region between the first electrode and the second electrode in a case where an electric field is formed by the first electrode and the second electrode after a voltage is applied across the first electrode and the second electrode.

Optionally, the liquid crystal lens further includes a buffer layer. The buffer layer is provided on one of the first transparent substrate and the second transparent substrate which is proximal to the at least one first electrode and the at least one second electrode, and the at least one first electrode and the at least one second electrode are provided on the buffer layer.

Optionally, the liquid crystal lens further includes an insulation component. The insulation component is provided between each of the at least one first electrode and an adjacent one of the at least one second electrode.

A second aspect of the present disclosure provides a lens assembly. The lens assembly includes a driving circuit and at least one liquid crystal lens. Each of the at least one liquid crystal lens includes the liquid crystal lens having any one of the structures as described above, and the driving circuit is configured to apply a driving voltage across the first electrode and the second electrode such that an electric field is formed between the first electrode and the second electrode.

A third aspect of the present disclosure provides an optical apparatus. The optical apparatus includes a lens located at a light incident side of the optical apparatus. The lens includes the liquid crystal lens having any one of the structures as described above.

A fourth aspect of the present disclosure provides a display device. The display device includes a display panel and a liquid crystal lens. The liquid crystal lens includes the liquid crystal lens having any one of the structures as described above, and is provided at light emergent side of the display panel.

Optionally, the display panel includes a liquid crystal display panel.

BRIEF DESCRIPTION OF THE DRAWINGS

The accompanying drawings, which are provided for further understanding of the present disclosure and constitute a part of the specification, are for the purpose of explaining the present disclosure in conjunction with the following embodiments, but are not intended to limit the present disclosure, wherein.

DETAILED DESCRIPTION

Embodiments of the present disclosure will be described in detail below with reference to the accompanying drawings. It should be noted that, the embodiments described herein are only for the purpose of explaining and illustrating the present disclosure, but are not intended to limit the scope of the present disclosure.

The inventors of the present disclosure have found that, in an existing liquid crystal lens, optical axes (i.e., major axes) of liquid crystal molecules are aligned parallel to a glass substrate of the liquid crystal lens in an initial state, and thus the liquid crystal molecules of the existing liquid crystal lens require a complicated alignment method. Especially for a liquid crystal lens in the shape of a sphere, the optical axes of all the liquid crystal molecules are radialized in the radial direction from the center of the sphere. Therefore, the required alignment directions are radiated outward from the center of the sphere, causing the manufacturing process to be very difficult and the manufacturing cost to be very high.

Therefore, it is a technical problem to be solved urgently in the art to provide a liquid crystal lens that does not require a complicated alignment process.

Figure 1:
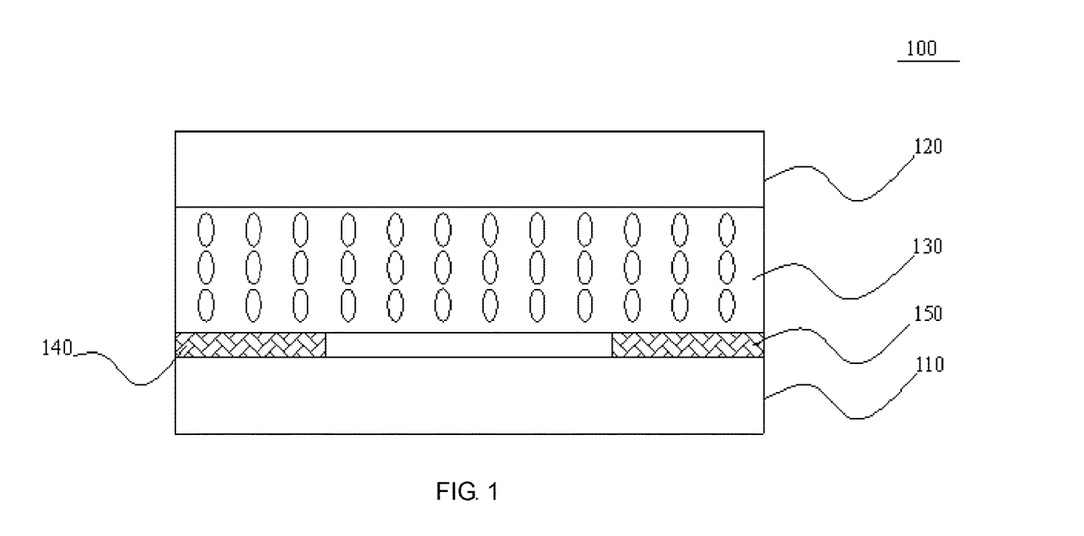
FIG. 1 is a schematic diagram showing a structure of a liquid crystal lens in a case where no electric field is formed between a first electrode and a second electrode of the liquid crystal lens, according to an embodiment of the present disclosure.
Figure 2:
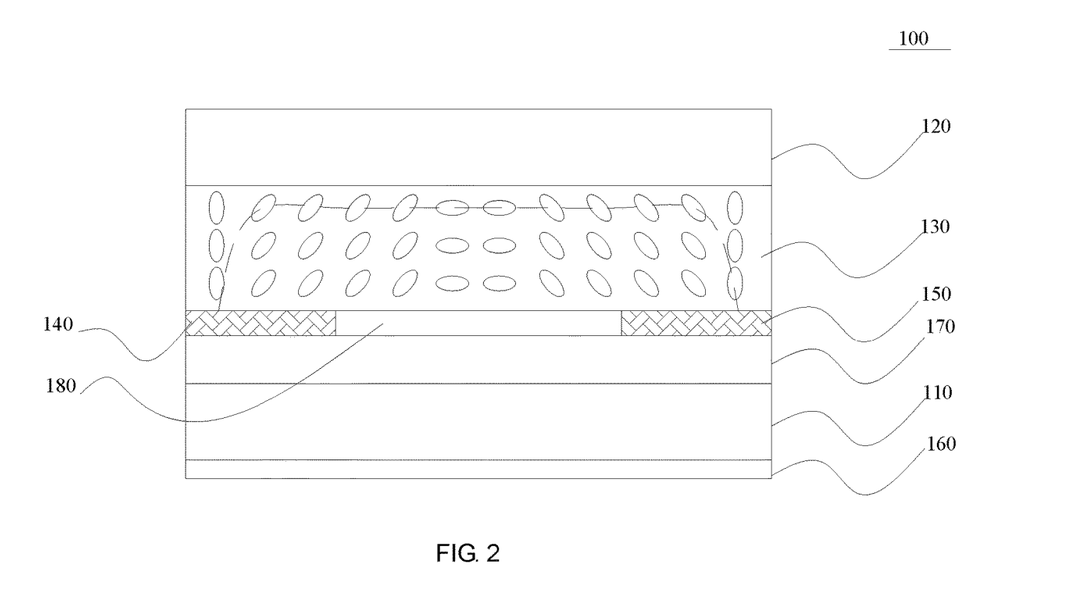
FIG. 2 is a schematic diagram showing a structure of a liquid crystal lens in a case where an electric field is formed between a first electrode and a second electrode of the liquid crystal lens, according to another embodiment of the present disclosure.

Referring to FIGS. 1 and 2, a first aspect of the present disclosure relates to a liquid crystal lens 100. The liquid crystal lens 100 includes a first transparent substrate 110 and a second transparent substrate 120 which are provided opposite to each other. The liquid crystal lens 100 further includes a liquid crystal layer 130, and the liquid crystal layer 130 is provided between the first transparent substrate 110 and the second transparent substrate 120.

Figure 4:
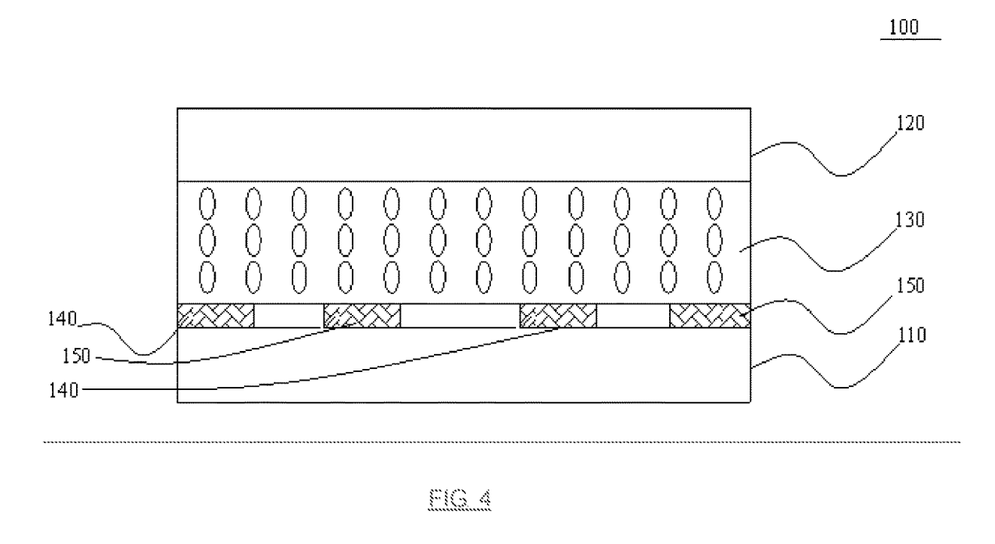
FIG. 4 is a schematic diagram showing a plurality of first electrodes and a plurality of second electrodes of a liquid crystal lens according to an embodiment of the present disclosure, wherein the first electrodes and the second electrodes are alternately arranged to be insulated from each other and have an interval therebetween.

At least one first electrode 140 and at least one second electrode 150 are provided at a side, which is proximal to the liquid crystal layer 130, of one of the first transparent substrate 110 and the second transparent substrate 120. The at least one first electrode 140 and the at least one second electrode 150 are alternately arranged to be insulated from each other and have an interval therebetween, as shown in FIG. 4.

It should be noted that, each of the at least one first transparent substrate 110 and each of the at least one second transparent substrate 120 may be glass substrates, and are not limited thereto. For example, each of the at least one first transparent substrate 110 and each of the at least one second transparent substrate 120 may be substrates with other configurations, as long as substrates made of other materials are transparent, such that light incident onto the liquid crystal lens 100 from the outside can be transmitted through the liquid crystal lens 100 in a case where the liquid crystal lens 100 is in an operating state, and a transmission direction of the light can be changed by the liquid crystal lens 100.

Optionally, the liquid crystal layer 130 includes a positive liquid crystal material. Under the control of an electric field, a major axis of each of liquid crystal molecules of the positive liquid crystal material is parallel to a direction of the electric field.

In the liquid crystal lens 100 according to the present embodiment, the liquid crystal layer 130 includes a positive liquid crystal material. As shown in FIG. 1, major axes of all liquid crystal molecules of the positive liquid crystal material are perpendicular to the first transparent substrate 110 or the second transparent substrate 120 in an initial state. Upon the first electrode 140 and the second electrode 150 having a potential difference therebetween, an electric field is formed between the first electrode 140 and the second electrode 150, as shown in FIG. 2. It should be noted that, since both the first electrode 140 and the second electrode 150 are located at one side of the first transparent substrate 110 or the second transparent substrate 120, the formed electric field has an electric field line along a substantially vertical direction at two respective ends of the first electrode 140 and the second electrode 150 far away from one another (that is, an end of the first electrode 140 distal to the second electrode 150 and an end of the second electrode 150 distal to the first electrode 140), and has an electric field line along a substantially horizontal direction in a central region between the first electrode 140 and the second electrode 150. In the presence of the electric field, a major axis of each of the liquid crystal molecules of the positive liquid crystal material will rotate to be finally parallel to the electric field direction in a region where the liquid crystal molecule is located, according to the characteristics of the positive liquid crystal material. Thus, the rotation of liquid crystal molecules may be easily controlled according to a magnitude of a potential difference between the first electrode 140 and the second electrode 150 and the distribution of the electric field, and thus a refractive index of the liquid crystal lens 100 at different positions thereof may be controlled, thereby realizing the function of an optical lens.

Further, in the liquid crystal lens 100 according to the present embodiment, since the positive liquid crystal material is provided between the first transparent substrate 110 and the second transparent substrate 120, in an initial state, the positive liquid crystal material is in a light transmissive state. That is, a major axis of each of the liquid crystal molecules is perpendicular to the first transparent substrate 110 or the second transparent substrate 120, and thus light can pass therethrough without changing its direction. Therefore, it is not required to align the liquid crystal molecules in a manufacturing process, which reduces the cost effectively. On the other hand, positive liquid crystal molecules are provided between the first transparent substrate 110 and the second transparent substrate 120 as the liquid crystal layer, resulting in an advantage that a driving voltage is reduced. Further, since the liquid crystal lens 100 does not require an alignment layer, and thus a rubbing alignment process may be omitted. Thus, the manufacturing efficiency is improved, and the manufacturing cost is reduced.

Optionally, each of the first electrode 140 and the second electrode 150 may be made of a transparent electrode material.

In the liquid crystal lens 100 according to the present embodiment, both the first electrode 140 and the second electrode 150 may have good transparency and good conductivity. Thus, in the present embodiment, for example, each of the first electrode 140 and the second electrode 150 may be made of a transparent electrode material such as indium tin oxide. In addition to the above-mentioned transparency and conductivity, indium tin oxide further has good chemical stability, good thermal stability, and good graphic processing properties. Alternatively, the first electrode 140 and the second electrode 150 each may be made of another material, as long as they have transparency and the electric conductivity.

Figure 5:
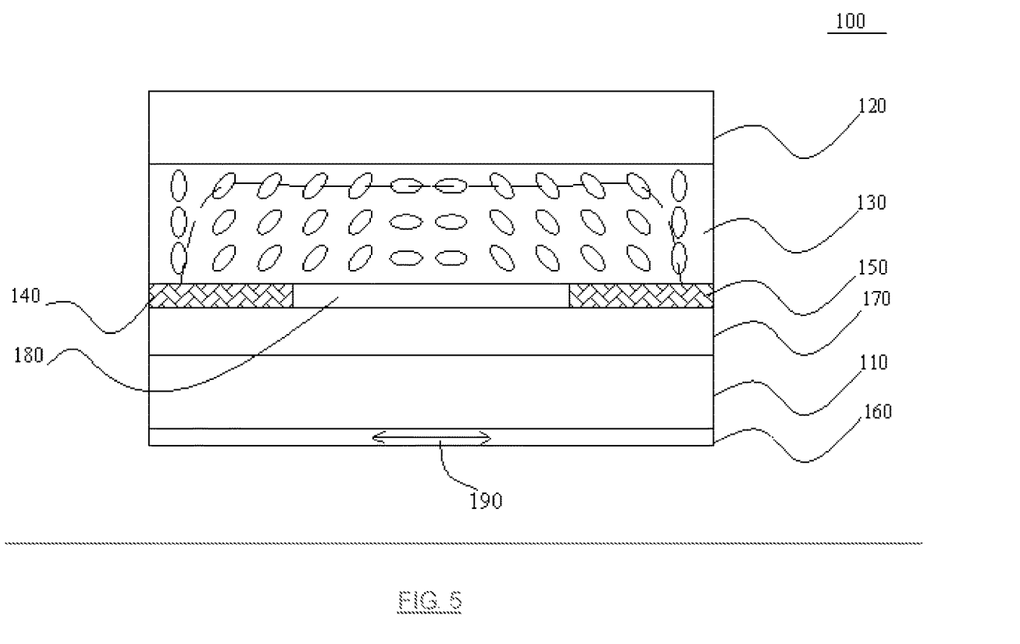
FIG. 5 is a schematic diagram showing a polarization direction of a polarizer of the liquid crystal lens as shown in FIG. 2, wherein the polarization direction is parallel to a major axis of each of liquid crystal molecules in a central region between the first electrode and the second electrode.

In order to facilitate modulation of light performed by the liquid crystal lens 100, light incident into the liquid crystal lens 100 may be linearly polarized light. To broaden the application areas to which the liquid crystal lens 100 may be applied, the liquid crystal lens 100 may further include a polarizer 160. For example, the polarizer 160 may be provided at a light incident side of the liquid crystal lens 100. Specifically, in a case where light is incident into the liquid crystal lens 100 from the first transparent substrate 110, the polarizer 160 may be provided on the first transparent substrate 110. For example, the polarizer 160 may be provided on an outer surface of the first transparent substrate 110, as shown in FIG. 2. A polarization direction (as shown by the double-headed arrow 190 in FIG. 5) of the polarizer 160 is parallel to a major axis of each of liquid crystal molecules in a central region between the first electrode 140 and the second electrode 150 in a case where an electric field is formed by the first electrode 140 and the second electrode 150 after a voltage is applied across the first electrode 140 and the second electrode 150.

It should be noted that, the liquid crystal lens 100 is not necessary to have the polarizer 160 provided thereon, as long as it is ensured that the light incident into the liquid crystal lens 100 is linearly polarized light. For example, the polarizer 160 may be provided on another component cooperating with the liquid crystal lens 100 (e.g., on a light emergent surface of a display panel).

Optionally, the liquid crystal lens 100 may further include a buffer layer 170, as shown in FIG. 2. For example, the buffer layer 170 may be provided on one of the transparent substrates, and the first electrode 140 and the second electrode 150 may be provided on the buffer layer 170. For example, the buffer layer 170 may be provided on the first transparent substrate 110, and the first electrode 140 and the second electrode 150 are provided on the buffer layer 170, as shown in FIG. 2.

The liquid crystal lens 100 according to the present embodiment may be provided with the buffer layer 170, and a material of the buffer layer 170 is not specifically limited herein. For example, the material of the buffer layer 170 may be silicon nitride. The material of silicon nitride may not only insulate the electrodes from the corresponding transparent substrate, but also enhance the adhesiveness between the electrodes and the corresponding transparent substrate and prevent impurities from diffusing.

Optionally, to insulate the first electrode 140 and the second electrode 150 from each other, the liquid crystal lens 100 may further include an insulation component 180, as shown in FIG. 2. For example, the insulation component 180 may be provided between each of the at least one first electrode 140 and an adjacent one of the at least one second electrode 150 (that is, between a pair of the first and second electrodes 140 and 150 adjacent to each other). A material of the insulation component 180 is not specifically limited herein, as long as it enables the first electrode 140 and the second electrode 150 to be insulated from each other.

The optical principle of the liquid crystal lens 100 will be described in detail below.

Continuing reference to FIG. 2, in a case where there is a potential difference between the first electrode 140 and the second electrode 150, since both the first electrode 140 and the second electrode 150 are located at one side of one of the transparent substrates (e.g., the first transparent substrate 110), an electric field formed between the first electrode 140 and the second electrode 150 has an electric field line along a substantially vertical direction at two respective ends of the first electrode 140 and the second electrode 150 far away from one another (that is, an end of the first electrode 140 distal to the second electrode 150 and an end of the second electrode 150 distal to the first electrode 140), and changes to have an electric field line along a substantially horizontal direction in a central region between the first electrode 140 and the second electrode 150. According to the distribution of electric field lines of the formed electric field, the region around the first electrode 140 and the second electrode 150 may include a central region, transition regions and end regions. Here, the end regions include two regions corresponding to the two respective ends of the first electrode 140 and the second electrode 150 far away from one another. The central region is located in the middle between the first electrode 140 and the second electrode 150. The transition regions are located between the end regions and the central region. According to the distribution of an electric field line of the electric field, an electric field line in the central region is parallel to the first transparent substrate 110 or the second transparent substrate 120, and an electric field line in each of the end regions is perpendicular to the first transparent substrate 110 or the second transparent substrate 120. An electric field line in each of the transition regions has a tilt angle with the first transparent substrate 110 or the second transparent substrate 120, i.e., is neither perpendicular to nor parallel to the first transparent substrate 110 or the second transparent substrate 120.

The above description explains the distribution of an electric field when the electric field is formed between the first electrode 140 and the second electrode 150. According to the distribution of the electric field, liquid crystal molecules in the electric field will rotate under the effect of the electric field, and each of the liquid crystal molecules will eventually have a major axis parallel to a direction of an electric field line at a position where the liquid crystal molecule is located. Specifically, the positive liquid crystal molecules of the two ends of the liquid crystal layer 130 corresponding to the end regions will not rotate, i.e., remains to be in the initial state, due to the direction of an electric field line in each of the end regions being perpendicular to the first transparent substrate 110 or the second transparent substrate 120. Each of all positive liquid crystal molecules in the central portion of the liquid crystal layer 130 corresponding to the central region will finally have a major axis parallel to the direction of an electric field line at a position where the liquid crystal molecule is located. Thus, a major axis of each of all positive liquid crystal molecules in the central portion of the liquid crystal layer 130 will be parallel to the first transparent substrate 110 or the second transparent substrate 120. Each of all positive liquid crystal molecules in transition portions of the liquid crystal layer 130 corresponding to the transition regions will have a major axis at a tilt angle with first transparent substrate 110 or the second transparent substrate 120, due to the direction of an electric field line in the transition regions having a tilt angle with the first transparent substrate 110 or the second transparent substrate 120.

Thus, under the effect of the electric field, each of the liquid crystal molecules of the positive liquid crystal material corresponding to the central region has a rotation degree greater than a rotation degree of each of the liquid crystal molecules of the positive liquid crystal material corresponding to the transition regions, and the rotation degree of each of the liquid crystal molecules of the positive liquid crystal material corresponding to the transition regions is greater than that of each of the liquid crystal molecules of the positive liquid crystal material corresponding to the end regions.

Figure 3:
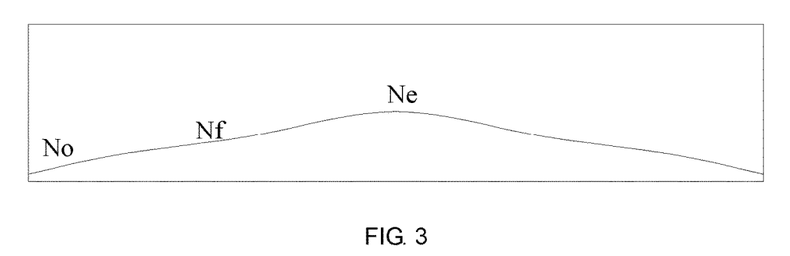
FIG. 3 is a schematic diagram showing the distribution of a refractive index of the liquid crystal lens in a case where an electric field is formed between the first electrode and the second electrode of the liquid crystal lens.

FIG. 3 is a schematic diagram showing the distribution of a refractive index of the liquid crystal lens in a case where an electric field is formed between the first electrode and the second electrode of the liquid crystal lens. In FIG. 3, the horizontal axis denotes positions in the liquid crystal layer 130 corresponding to the central region, the transition regions, and the end regions around the first electrode 140 and the second electrode 150, and the vertical axis denotes a refractive index of the corresponding positive liquid crystal molecules of the liquid crystal layer 130. Referring to FIG. 3, a refractive index of the liquid crystal molecules of the positive liquid crystal material corresponding to the central region is denoted by Ne; a refractive index of the liquid crystal molecules of the positive liquid crystal material corresponding to the end regions is denoted by No; and a refractive index of the liquid crystal molecules of the positive liquid crystal material corresponding to the transition regions is denoted by Nf. According to the rotation rule of the positive liquid crystal molecules, the refractive indexes Ne, No, and Nf satisfy the following formula:

Ne>Nf>No.

Thus, in a case where there is a potential difference between the first electrode 140 and the second electrode 150, the liquid crystal lens according to the present disclosure will have refractive indexes according to the above-described distribution, thereby realizing the function of an optical lens, being an equivalent lens to the optical lens, and having an equivalent focal length. Therefore, by controlling a magnitude of a potential difference between the first electrode 140 and the second electrode 150, the magnitudes of refractive indexes at different positions in the liquid crystal lens 100 may be controlled, thereby changing the equivalent focal length of the equivalent lens. The liquid crystal lens 100 may be applied to another area, for example, to the area of optical apparatus such as a camera or the like. A conventional camera often uses a focusing ring on the lens thereof when focusing, and a distance scale is engraved on the focusing ring, the distance scale corresponding to a focusing amount and indicating a distance between the film thereof and an object to be photographed. The focus ring drives the multi-head thread on the lens barrel, allowing the lens to move axially so that the focus of the lens is located on the film plane. In a case where the liquid crystal lens 100 is applied to a camera, the camera may have a more compact structure. For example, by adjusting the equivalent focal length of the equivalent lens of the liquid crystal lens 100, the camera may have different focal lengths for imaging at different distances without manual focusing.

A second aspect of the present disclosure provides a lens assembly (not shown). The lens assembly may include a driving circuit (not shown) and the liquid crystal lens 100 according to each of the embodiments as shown in FIGS. 1 and 2. The driving circuit may be connected to the first electrode 140 and the second electrode 150, respectively, and configured to apply a driving voltage across the first electrode 140 and the second electrode 150 such that an electric field is formed between the first electrode 140 and the second electrode 150.

It should be noted that, the driving circuit may, for example, include circuit devices such as a power source, a switching element, and the like, and the power source may be electrically connected to the first electrode 140 and the second electrode 150, respectively, so as to provide a driving voltage across the first electrode 140 and the second electrode 150. However, the configuration of the driving circuit is not limited thereto. In this way, the liquid crystal lens of the lens assembly may have the distribution of refractive indexes corresponding to the driving voltage, thereby realizing the function of an optical lens.

Due to including the liquid crystal lens 100 according to each of the embodiments as shown in FIGS. 1 and 2 of the present disclosure, the lens assembly according to the present embodiment has the function of an optical lens, in a case where the driving circuit applies a driving voltage across the first electrode 140 and the second electrode 150 of the liquid crystal lens 100 such that a potential difference is present between the first electrode 140 and the second electrode 150 to enable formation of an electric field. Thus, the lens assembly can change a direction in which light travels. Further, since the two electrodes are located at one side of one of the transparent substrates, a required driving voltage is relatively low. In addition, since the liquid crystal lens 100 does not include an alignment layer, a rubbing alignment process is not required, thereby improving the manufacturing efficiency and reducing the manufacturing cost.

A third aspect of the present disclosure provides an optical apparatus (not shown). The optical apparatus may include a lens located at a light incident side of the optical apparatus, and the lens may include the liquid crystal lens 100 according to each of the embodiments as shown in FIGS. 1 and 2.

The optical apparatus according to the present embodiment may be a camera. A lens of the camera may be the liquid crystal lens 100 according to each of the embodiments as shown in FIGS. 1 and 2 of the present disclosure, and other components of the camera may be existing components. A conventional camera often uses a focusing ring on the lens thereof when focusing, and a distance scale is engraved on the focusing ring, the distance scale corresponding to a focusing amount and indicating a distance between the film thereof and an object to be photographed. The focus ring drives the multi-head thread on the lens barrel, allowing the lens to move axially so that the focus of the lens is located on the film plane. In contrast, due to including the liquid crystal lens according to the present disclosure, the optical apparatus according to the present embodiment may have different focal lengths, by adjusting the equivalent focal length of the equivalent lens of the liquid crystal lens 100 without manual focusing. In this way, the optical apparatus may have a significantly improved operability and a simpler structure.

A fourth aspect of the present disclosure provides a display device (not shown). The display device may include a display panel (not shown). The display device may further include the liquid crystal lens 100 according to each of the embodiments as shown in FIGS. 1 and 2 of the present disclosure, and the liquid crystal lens 100 may be provided at a light emergent side of the display panel.

The display device according to the present embodiment may be employed to switch between two-dimensional display and three-dimensional display (i.e., perform 2D/3D switching). For example, in the case of two-dimensional display, there may be no electric field formed between the first electrode 140 and the second electrode 150 of the liquid crystal lens 100, so that the light from the display panel does not change its propagation direction during passing through the liquid crystal lens 100, thereby achieving two-dimensional (2D) display. In the case of three-dimensional display, it is only necessary to control the voltage difference between the corresponding electrodes (i.e., the first electrode 140 and the second electrode 150), such that the electric field formed between the first electrode 140 and the second electrode 150 causes the liquid crystal molecules at different positions in the liquid crystal layer 130 of the liquid crystal lens 100 to rotate by different angles, respectively, making the distribution of the refractive indexes of the liquid crystal lens 100 change accordingly. As a result, light rays emitted from left-eye images and right-eye images arranged on pixels of the display panel may be received by the left eye and the right eye of a viewer, respectively, thereby achieving three-dimensional (3D) display. In this way, switching may be performed between the 2D display mode and the 3D display mode.

Optionally, the display panel may include a liquid crystal display panel. Alternatively, the display panel may be a display panel with another structure.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A liquid crystal lens, comprising
a first transparent substrate;
a second transparent substrate, provided opposite to the first transparent substrate;
a liquid crystal layer, provided between the first transparent substrate and the second transparent substrate; and
at least one first electrode and at least one second electrode, both of which being provided at a side of one of the first transparent substrate and the second transparent substrate proximal to the liquid crystal layer;
wherein the first electrode and the second electrode are alternately arranged to be insulated from each other and have an interval therebetween, and
no alignment layer is included in the liquid crystal lens, and major axes of all liquid crystal molecules of the liquid crystal layer are perpendicular to the first transparent substrate or the second transparent substrate in a state of no electric field in the liquid crystal lens.

2. The liquid crystal lens according to claim 1, wherein each of the first electrode and the second electrode is made of a transparent electrode material.

3. The liquid crystal lens according to claim 1, wherein the liquid crystal layer comprises a positive liquid crystal material.

4. The liquid crystal lens according to claim 1, further comprising a polarizer, wherein the polarizer is provided on a light incident surface of the liquid crystal lens, and a polarization direction of the polarizer is parallel to a major axis of each of liquid crystal molecules in a central region between the first electrode and the second electrode in a case where an electric field is formed by the first electrode and the second electrode after a voltage is applied across the first electrode and the second electrode.

5. The liquid crystal lens according to claim 1, further comprising a buffer layer, wherein the buffer layer is provided on one of the first transparent substrate and the second transparent substrate which is proximal to the at least one first electrode and the at least one second electrode, and the at least one first electrode and the at least one second electrode are provided on the buffer layer.

6. The liquid crystal lens according to claim 1, further comprising an insulation component, wherein the insulation component is provided between each of the at least one first electrode and an adjacent one of the at least one second electrode.

7. A lens assembly, comprising a driving circuit and at least one liquid crystal lens, wherein each of the at least one liquid crystal lens comprises the liquid crystal lens according to claim 1, and the driving circuit is configured to apply a driving voltage across the first electrode and the second electrode such that an electric field is formed between the first electrode and the second electrode.

8. An optical apparatus, comprising a lens located at a light incident side of the optical apparatus, wherein the lens comprises the liquid crystal lens according to claim 1.

9. A display device, comprising a display panel and a liquid crystal lens, wherein the liquid crystal lens comprises the liquid crystal lens according to claim 1, and is provided at light emergent side of the display panel.

10. The display device according to claim 9, wherein the display panel comprises a liquid crystal display panel.

11. The liquid crystal lens according to claim 2, further comprising a polarizer, wherein the polarizer is provided on a light incident surface of the liquid crystal lens, and a polarization direction of the polarizer is parallel to a major axis of each of liquid crystal molecules in a central region between the first electrode and the second electrode in a case where an electric field is formed by the first electrode and the second electrode after a voltage is applied across the first electrode and the second electrode.

12. The liquid crystal lens according to claim 3, further comprising a polarizer, wherein the polarizer is provided on a light incident surface of the liquid crystal lens, and a polarization direction of the polarizer is parallel to a major axis of each of liquid crystal molecules in a central region between the first electrode and the second electrode in a case where an electric field is formed by the first electrode and the second electrode after a voltage is applied across the first electrode and the second electrode.

13. The liquid crystal lens according to claim 2, further comprising a buffer layer, wherein the buffer layer is provided on one of the first transparent substrate and the second transparent substrate which is proximal to the at least one first electrode and the at least one second electrode, and the at least one first electrode and the at least one second electrode are provided on the buffer layer.

14. The liquid crystal lens according to claim 3, further comprising a buffer layer, wherein the buffer layer is provided on one of the first transparent substrate and the second transparent substrate which is proximal to the at least one first electrode and the at least one second electrode, and the at least one first electrode and the at least one second electrode are provided on the buffer layer.

15. The liquid crystal lens according to claim 4, further comprising a buffer layer, wherein the buffer layer is provided on one of the first transparent substrate and the second transparent substrate which is proximal to the at least one first electrode and the at least one second electrode, and the at least one first electrode and the at least one second electrode are provided on the buffer layer.

16. The liquid crystal lens according to claim 11, further comprising a buffer layer, wherein the buffer layer is provided on one of the first transparent substrate and the second transparent substrate which is proximal to the at least one first electrode and the at least one second electrode, and the at least one first electrode and the at least one second electrode are provided on the buffer layer.

17. The liquid crystal lens according to claim 12, further comprising a buffer layer, wherein the buffer layer is provided on one of the first transparent substrate and the second transparent substrate which is proximal to the at least one first electrode and the at least one second electrode, and the at least one first electrode and the at least one second electrode are provided on the buffer layer.

18. The liquid crystal lens according to claim 2, further comprising an insulation component, wherein the insulation component is provided between each of the at least one first electrode and an adjacent one of the at least one second electrode.

19. The liquid crystal lens according to claim 3, further comprising an insulation component, wherein the insulation component is provided between each of the at least one first electrode and an adjacent one of the at least one second electrode.

20. The liquid crystal lens according to claim 4, further comprising an insulation component, wherein the insulation component is provided between each of the at least one first electrode and an adjacent one of the at least one second electrode.

\* \* \* \* \*